(12) United States Patent
Wang et al.

(10) Patent No.: US 10,460,016 B2
(45) Date of Patent: Oct. 29, 2019

(54) METHOD AND APPARATUS FOR PLAYING MULTIMEDIA IN BROWSER

(71) Applicant: Tencent Technology (Shenzhen) Co., Ltd., Shenzhen, Guangdong (CN)

(72) Inventors: Lianghu Wang, Guangdong (CN); Jie Liu, Guangdong (CN); Mingming He, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 224 days.

(21) Appl. No.: 14/740,894

(22) Filed: Jun. 16, 2015

(65) Prior Publication Data

US 2015/0278174 A1    Oct. 1, 2015

Related U.S. Application Data (63) Continuation of application No. PCT/CN2013/089622, filed on Dec. 17, 2013.

(30) Foreign Application Priority Data

Dec. 17, 2012 (CN) .......................... 2012 1 0547780

(51) Int. Cl.
*G06F 17/00* (2019.01)
*G06F 17/22* (2006.01)
(Continued)

(52) U.S. Cl.
CPC ...... *G06F 17/2247* (2013.01); *G06F 11/3003* (2013.01); *G06F 16/40* (2019.01); *H04L 67/02* (2013.01)

(58) Field of Classification Search
CPC ................................................. G06F 17/30905
See application file for complete search history.

(56) References Cited

U.S. PATENT DOCUMENTS

2009/0049385 A1 * 2/2009 Blinnikka ............. G06F 3/0481
  715/719
2011/0191676 A1   8/2011 Guttman et al.
(Continued)

FOREIGN PATENT DOCUMENTS

CN           1588864 A      3/2005
CN         101520809 A      9/2009
(Continued)

OTHER PUBLICATIONS

International Search Report dated Mar. 20, 2014 for corresponding International Application No. PCT/CN2013/089622, 5 pages.
(Continued)

*Primary Examiner* — Scott T Baderman
*Assistant Examiner* — Barbara M Level
(74) *Attorney, Agent, or Firm* — Morgan, Lewis & Bockius LLP (57) ABSTRACT

The present disclosure provides a method and an apparatus for playing multimedia in a browser of a User equipment. The method includes: playing a multimedia file in a multimedia playing container located in a browser visible area; moving the browser visible area, and monitoring a position of the multimedia playing container relative to the browser visible area; and setting, in case of determining according to the position of the multimedia playing container relative to the browser visible area that the multimedia playing container is moved out of the browser visible area, a position attribute of the multimedia playing container to move the multimedia playing container into the browser visible area. By using the embodiments of the present disclosure, a user can still normally browse multimedia when a multimedia
(Continued)

playing area is moved out of a current visible area of the browser screen, and operational complexity is also reduced.

13 Claims, 5 Drawing Sheets

(51) Int. Cl.
*G06F 11/30* (2006.01)
*H04L 29/08* (2006.01)
*G06F 16/40* (2019.01)

(56) References Cited

U.S. PATENT DOCUMENTS

| | | | | |
|---|---|---|---|---|
| 2012/0166950 A1* | 6/2012 | Frumar | ............... | G06F 3/04883 |
| | | | | 715/719 |
| 2012/0254729 A1* | 10/2012 | Wan | ................. | G06F 17/30905 |
| | | | | 715/234 |
| 2012/0310751 A1* | 12/2012 | Kim | ....................... | G06Q 30/02 |
| | | | | 705/14.72 |
| 2014/0237365 A1* | 8/2014 | Oberbrunner | .......... | G11B 27/34 |
| | | | | 715/722 |
| 2015/0212694 A1* | 7/2015 | Ho | ....................... | G06F 3/04842 |
| | | | | 715/800 |

FOREIGN PATENT DOCUMENTS

| | | |
|---|---|---|
| CN | 102117290 A | 7/2011 |
| CN | 102819379 A | 12/2012 |
| CN | 102968509 A | 3/2013 |

OTHER PUBLICATIONS

Office Action dated Jan. 4, 2015 for corresponding Chinese Application No. 201210547780.2, 12 pages.

\* cited by examiner

METHOD AND APPARATUS FOR PLAYING MULTIMEDIA IN BROWSER

RELATED APPLICATION

This application is a continuation of PCT/CN2013/089622, filed on Dec. 17, 2013 and titled "METHOD AND APPARATUS FOR PLAYING MULTIMEDIA IN BROWSER", which claims priority to Chinese Patent Application No. 201210547780.2, titled "METHOD AND APPARATUS FOR PLAYING MULTIMEDIA IN BROWSER" filed on Dec. 17, 2012, both of which are incorporated herein by reference in their entirety.

FIELD OF THE TECHNOLOGY

The present disclosure relates to the field of information processing technologies, and in particular, to a method and an apparatus for playing multimedia in a browser.

BACKGROUND OF THE DISCLOSURE

With the rapid development of computer technologies and network technologies, the Internet and instant messaging technologies play a greater role in people's daily lives, study, and work. Moreover, with the development of the mobile Internet, the Internet also develops towards mobilization.

In the era of information nowadays, various information devices have emerged, for example, fixed-line phones and mobile phones for voice transmission, servers and personal computers for sharing and processing of information resources, and various televisions for displaying video data. All these devices appear to satisfy actual needs in specific fields. With the arrival of convergence of computer, communication, and consumer electronics (3C), people are paying more attention to study on integrated utilization of information devices in different fields, so as to make full use of the existing device resources to provide people with better services.

Following a development trend of user-generated content (UGC) brought about by social networks, users often browse a large amount of multimedia information (for example, videos, music, and pictures) shared by friends in various social websites such as cyberspace. For example, a social website may generally provide an aggregation webpage presenting friends' status. After a friend shares a video, a user may play and watch the video on the aggregation webpage.

However, it is impossible for a user to drag the webpage to view other information while watching the video. The reason is that the video may be caused to leave a visible area if the user drags the webpage to view other information, and the user can no longer watch the video normally. That is, a disadvantage of the existing technology lies in that a user can only choose to browse a multimedia file such as a video or to browse other webpage content such as more information of friends' status and cannot do both at the same time.

Moreover, in the existing technology, if a user wants to continue to view a video, the user needs to keep scrolling the webpage to find a position where the video is played before, and such an operation is highly complicated.

SUMMARY

The present disclosure provides a method for playing multimedia in a browser of a user equipment (UE), so that when a multimedia playing area is moved out of a current visible area on a display or a screen of the UE, a user can still browse multimedia.

The present disclosure further provides an apparatus (such as a user equipment (UE) for playing multimedia in a browser, so that when a multimedia playing area is moved out of a current visible area, a user can still browse multimedia content (such as a multimedia file).

Specific solutions of the embodiments of the present disclosure are as follows.

A method for playing multimedia in a browser of a user equipment (UE), includes: playing a multimedia file in a multimedia playing container located in a browser visible area:

moving the browser visible area, and monitoring a position of the multimedia playing container relative to the browser visible area; and setting, in case of determining according to the position of the multimedia playing container relative to the browser visible area that the multimedia playing container is moved out of the browser visible area, a position attribute of the multimedia playing container to move the multimedia playing container into the browser visible area.

An apparatus for playing multimedia in a browser, includes a multimedia file playing unit, a visible area moving unit, and a multimedia playing container moving unit, where:

the multimedia file playing unit is configured to play a multimedia file in a multimedia playing container located in a browser visible area;

the visible area moving unit is configured to move the browser visible area, and monitor a position of the multimedia playing container relative to the browser visible area; and the multimedia playing container moving unit is configured to set, in case of determining according to the position of the multimedia playing container relative to the browser visible area that the multimedia playing container is moved out of the browser visible area, a position attribute of the multimedia playing container to move the multimedia playing container into the browser visible area.

It can be seen from the above technical solutions that, in the embodiments of the present disclosure, a multimedia file is played in a multimedia playing container located in a browser visible area; the browser visible area is moved, and a position of the multimedia playing container relative to the browser visible area is monitored; and in case of determining according to the position of the multimedia playing container relative to the browser visible area that the multimedia playing container is moved out of the browser visible area, a position attribute of the multimedia playing container is set to move the multimedia playing container into the browser visible area. In view of the above, with the embodiments of the present disclosure, if a multimedia playing container which performs playing currently leaves a screen visible area, a position attribute of the multimedia playing container may be set to enable the multimedia playing container to be presented in a new visible area, so that a user can follow changes in multimedia information while browsing other information, and therefore a user can still browse multimedia when a multimedia playing area is moved out of a current visible area.

Moreover, with the embodiments of the present disclosure, once a user continues to scroll a webpage and an original video position of a multimedia playing container is again located in a visible area, the video playing container can also be switched back to the original video position, so that operational complexity is reduced.

BRIEF DESCRIPTION OF THE DRAWINGS

FIG. 2a and FIG. 2b are schematic diagrams of movement of a browser visible area according to an embodiment of the present disclosure, in which

DESCRIPTION OF EMBODIMENTS

To make the objectives, technical solutions, and advantages of the present disclosure more clear, the present disclosure is further described in detail below with reference to the appending drawings. Throughout the description of the embodiments, it should be understood that the term "browser" refers to the content which are being displayed or viewed on a browser screen (i.e., display) of a user equipment (UE), such as a mobile phone, a handheld tablet communication device, a communication terminal, a server, a laptop computer, a desk top computer or any portable communication device with a display to display the multimedia content. The present disclosure provides an implementation solution that enables a user to browse multimedia content on a browser screen of a UE, and at the same time browse other webpage information (for example, aggregated content) by dragging the webpage.

In the embodiments of the present disclosure, when a user views a multimedia file (for example, a video) on a browser screen of a UE by using a browser, a webpage dragging trigger operation and a position of a multimedia playing container are monitored. If the multimedia playing container that is performing playing currently leaves a screen visible area, a position attribute of the multimedia playing container may be set to enable the multimedia playing container to be presented in a new visible area, so that the user can follow changes in multimedia information while browsing other information.

Moreover, in the embodiments of the present disclosure, a user can drag, at any position in the visible area, the multimedia playing container that is moved out, so as to prevent any unnecessary block.

Figure 1:
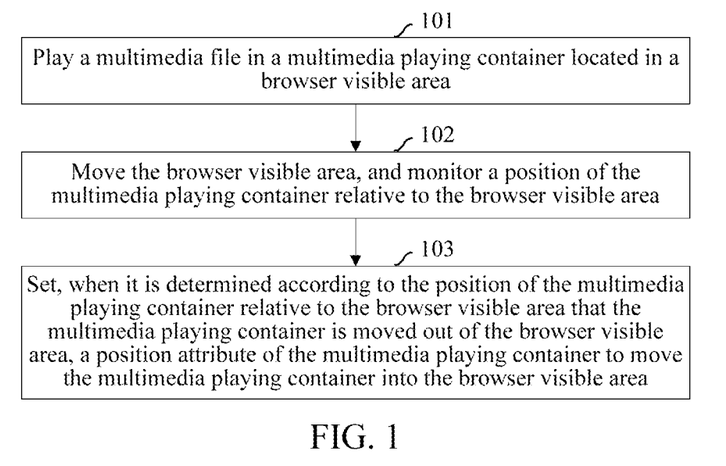
FIG. 1 is a flowchart of a method for playing multimedia in a browser according to an embodiment of the present disclosure.

FIG. 1 is a flowchart of a method for playing multimedia in a browser according to an embodiment of the present disclosure.

As shown in FIG. 1, the method includes the following steps.

In Step 101, a multimedia file is played in a multimedia playing container located in a browser visible area.

In this step, various multimedia files, for example, a video file, an audio file, an image file, and a streaming media file, may be played in the multimedia playing container located in the browser visible area. The multimedia playing container may specifically be various plug-ins, windows, or frames. For example, the multimedia playing container may be a video playing window and/or an audio playing window embedded into a webpage.

Moreover, a user may play a multimedia file by using a browser on various terminals. These terminals may include, but are not limited to, a functional mobile phone, a smart phone, a palm computer, a personal computer (PC), a tablet computer, or a personal digital assistant (PDA).

Although in the above specific examples of the terminals are listed in detail, a person skilled in the art may realize that these examples are listed only for the purpose of description, but are not used to limit the scope of the embodiment of the present disclosure.

When a browser on a mobile terminal is used to play a multimedia file, any operating system for intelligent terminal is applicable. The operating system that may be specifically used includes, but is not limited to: Palm OS, Symbian, Windows mobile, Linux, Android, iPhone OS, Black Berry OS 6.0, and Windows Phone series.

When a browser on a mobile terminal is used to play a multimedia file, Android operating system may specifically be used on the mobile terminal. In addition, various versions of Android may be used on the mobile terminal, and the versions include, but are not limited to, Astro Boy (Android Beta), Bender (Android 1.0), Cupcake (Android 1.5), Donut (Android 1.6), Éclair (Android 2.0/2.1), Froyo (Android 2.2), Gingerbread (Android 2.3), Honeycomb (Android 3.0), Ice Cream Sandwich (Android 4.0), and Jelly Bean (Android 4.1).

In the above specific versions of Android platform are listed in detail. A person skilled in the art can realize that the embodiment of the present disclosure is not limited to the above listed versions, and may also be applicable to any other version based on Android software architecture.

The browser may specifically be browsers such as Internet Explorer from Microsoft, Firefox from Mozilla, Safari from Apple, Opera, Google Chrome, and GreenBrowser.

Although in the above some commonly used browsers are listed in detail, a person skilled in the art can realize that the embodiment of the present disclosure is not limited to these browsers, and may be applicable to any application (App) that can be used to display a file on a webpage server or in a file system and allows interaction between user and the file. These applications may be various common browsers at present, or may also be any other application program with a webpage browsing function.

In Step 102, the browser visible area is moved, and a position of the multimedia playing container relative to the browser visible area is monitored.

In this step, a webpage scrolling trigger operation triggered by a user is monitored. The webpage scrolling trigger operation may specifically be a mouse scrolling event, a keyboard control event, and a touch screen scrolling event.

After the webpage scrolling trigger operation sent by the user is monitored, a webpage in the browser may be scrolled in response to the webpage scrolling trigger operation. The browser visible area may move along with the scrolling of the webpage. In this case, the position of the multimedia playing container relative to the browser visible area also changes correspondingly. In the embodiment of the present disclosure, the position of the multimedia playing container relative to the browser visible area is also monitored.

In Step 103, in case of determining according to the position of the multimedia playing container relative to the browser visible area that the multimedia playing container is moved out of the browser visible area, a position attribute of the multimedia playing container is set to move the multimedia playing container into the browser visible area.

In this step, based on specific different application scenarios, the position attribute of the multimedia playing container may be set immediately to move the multimedia playing container into the browser visible area when the multimedia playing container starts to be moved out of the browser visible area; or the position attribute of the multimedia playing container may be set to move the multimedia playing container into the browser visible area when the multimedia playing container is completely moved out of the browser visible area; or, the position attribute of the multimedia playing container may be set at any time during the process that the multimedia playing container is moved out of the browser visible area, so as to move the multimedia playing container into the browser visible area.

For example, it may be determined according to a distance by which the browser visible area is already moved and an absolute distance of the multimedia playing container on a browser screen that the multimedia playing container is moved out of the browser visible area.

For example, if a start point of a browser screen absolute position is an upper edge, when the browser visible area is moved downwards on the screen, and a difference between the distance by which the browser visible area is already moved (the distance from an outer edge of the browser visible area, that is close to the start point of the browser screen absolute position, to the start point of the browser screen absolute position) and the absolute distance of the multimedia playing container on the browser screen (the distance from an outer edge of the multimedia playing container, that is close to the start point of the browser screen absolute position, to the start point of the browser screen absolute position) is greater than the height of the multimedia playing container, it is determined that the multimedia playing container is moved out of the browser visible area; and/or when the browser visible area is moved upwards on the screen, if a difference between a value of the distance by which the browser visible area is already moved (the distance from the outer edge of the browser visible area, that is close to the start point of the browser screen absolute position, to the start point of the browser screen absolute position) plus the height of the browser visible area and the absolute distance of the multimedia playing container on the browser screen (the distance from the outer edge of the multimedia playing container, that is close to the start point of the browser screen absolute position, to the start point of the browser screen absolute position) is less than 0, it is determined that the multimedia playing container is moved out of the browser visible area.

If a start point of a browser screen absolute position is a lower edge, when the browser visible area is moved downwards on the screen, and a difference between a value of the distance by which the browser visible area is already moved (the distance from the outer edge of the browser visible area, that is close to the start point of the browser screen absolute position, to the start point of the browser screen absolute position) plus the height of the browser visible area and the absolute distance of the multimedia playing container on the browser screen (the distance from the outer edge of the multimedia playing container, that is close to the start point of the browser screen absolute position, to the start point of the browser screen absolute position) is less than 0, it is determined that the multimedia playing container is moved out of the browser visible area; and/or when the browser visible area is moved upwards on the screen, if a difference between the distance by which the browser visible area is already moved (the distance from the outer edge of the browser visible area, that is close to the start point of the browser screen absolute position, to the start point of the browser screen absolute position) and the absolute distance of the multimedia playing container on the browser screen (the distance from the outer edge of the multimedia playing container, that is close to the start point of the browser screen absolute position, to the start point of the browser screen absolute position) is greater than the height of the multimedia playing container, it is determined that the multimedia playing container is moved out of the browser visible area.

Similarly, if a start point of a browser screen absolute position is a left edge or a right edge, when the moving direction of the browser visible area is leftwards or rightwards on the screen, it may also be determined according to a distance by which the visible area is already moved and an absolute distance of the multimedia playing container on the browser screen that the multimedia playing container is moved out of the browser visible area.

In an embodiment, in case of determining according to the position of the multimedia playing container relative to the browser visible area that the multimedia playing container is moved out of the browser visible area, a position attribute of the multimedia playing container may be set to move the multimedia playing container into the browser visible area.

It can be seen that, in the embodiment of the present disclosure, a multimedia playing container which performs playing currently may be moved into a new visible area of a browser, so that multimedia that is played currently is not affected. For example, it is unnecessary to stop a multimedia file that is played currently or to reload a multimedia file that is played currently, and really smooth switching of the multimedia playing container from a blocked area to a visible area is achieved.

In the embodiment of the present disclosure, the position attribute of the multimedia playing container may be set in multiple modes.

The position attribute of the multimedia playing container may be of multiple types, for example, a position attribute value of the multimedia playing container, which may include various attributes such as "absolute", "relative", and "fixed".

A multimedia playing container may be fixed relative to a webpage border by setting an absolute attribute for the multimedia playing container. A multimedia playing container may be fixed relative to a screen by setting a fixed attribute for the multimedia playing container. If a position attribute is also set for a parent object (or a great grandparent object, as long as it is a parent object) of a multimedia playing container and the position attribute value is "absolute" or "relative", that is, in a case in which a default value is not set, the multimedia playing container may be positioned based on the parent object. If the multimedia playing container does not have a parent object having a position attribute, a body is used as an object to be positioned and positioning is performed based on a window of a browser.

The embodiment of the present disclosure is described by using an example in which a position attribute of a multimedia playing container is set as "fixed".

In an embodiment, a position attribute of a multimedia playing container may be set as "fixed", and a left margin and a top margin of the multimedia playing container are set, so as to set the multimedia playing container to be in a blank area of the browser visible area.

In the embodiment of the present disclosure, a zooming operation may also be performed on the multimedia playing container that is moved into the blank area of the new visible area. Specifically, a width value and a height value of the multimedia playing container may be set, so as to perform a zooming-out or zooming-in operation on the multimedia playing container.

Specifically, after it is acquired that the multimedia playing container which performs playing currently leaves the visible area, a mode of laying out playing container nodes may be set by using a relevant webpage operation interface provided by the browser. A position attribute of an element of a multimedia playing container may be set as "fixed", that is, an element of a current multimedia playing container is laid out relative to a browser visible window.

By setting left and top margins of the multimedia playing container, a node of a multimedia playing container that has left the visible area may be put back into the browser visible area. Because the video in the multimedia playing container is in a playing state, when the position attribute of the layout mode is changed into "fixed", the element of the multimedia playing container is not reloaded, thereby achieving that a user views other webpage elements such as friends' status and at the same time browses a multimedia file.

The above describes the embodiment of the present disclosure in detail by using an example in which a position attribute of a multimedia playing container is set as "fixed". A person skilled in the art may realize that such description is only used for explanation, but is not used to limit the protection scope of the embodiment of the present disclosure.

In the embodiment of the present disclosure, attribute information of multimedia file (for example, a name of a multimedia file) may be further acquired. The method may further include:

displaying, when the multimedia playing container is moved into the browser visible area, the attribute information of the multimedia file in a caption bar of the multimedia playing container, so that various types of attribute information of the multimedia file including the name of the multimedia file may be displayed in the caption bar of the multimedia playing container.

In the embodiment of the present disclosure, a step of acquiring multimedia playing information (for example, multimedia playing duration) may be further included. The method may further include:

controlling, after the multimedia playing container is moved into the browser visible area, playing of the multimedia file, according to the multimedia playing information. For example, a prompt may be sent to a user in case of determining according to the multimedia playing duration that playing of the current multimedia file is completed.

Preferably, when the original position of the multimedia playing container returns to the browser visible area again, the position attribute of the multimedia playing container is set to move the multimedia playing container to the original position.

For example, after the position where the multimedia playing container is originally located again returns to the screen visible area, a style of the multimedia playing container may be set as an original state of the multimedia playing container. For example, a fixed value of the position attribute of the multimedia playing container is removed, so that the multimedia playing container returns to an original playing state after returning to a visible screen area.

In this step, once a user continues to scroll the webpage and the original position of the multimedia playing container is again located in the visible area, the current multimedia playing container may be preferably switched back to the original position. In addition, the switching process may be presented by using various types of animation effects regardless of whether the multimedia playing container is switched back to the original position or the multimedia playing container is moved out of the current visible area.

For example, the presentation mode of moving the multimedia playing container into the browser visible area or switching the multimedia playing container back to the original position may includes at least one of the following: moving the multimedia playing container into the browser visible area in a fade-in, fade-out display mode; moving the multimedia playing container into the browser visible area in a direct switching display mode; moving the multimedia playing container into the browser visible area in a mode in which the multimedia playing container is moved rightwards in the process of moving the browser visible area; moving the multimedia playing container into the browser visible area in a mode in which the multimedia playing container is moved leftwards in the process of moving the browser visible area; moving the multimedia playing container into the browser visible area in a mode in which the multimedia playing container is moved upwards in the process of moving the browser visible area; or moving the multimedia playing container into the browser visible area in a mode in which the multimedia playing container is moved downwards in the process of moving the browser visible area.

Figure 2A:
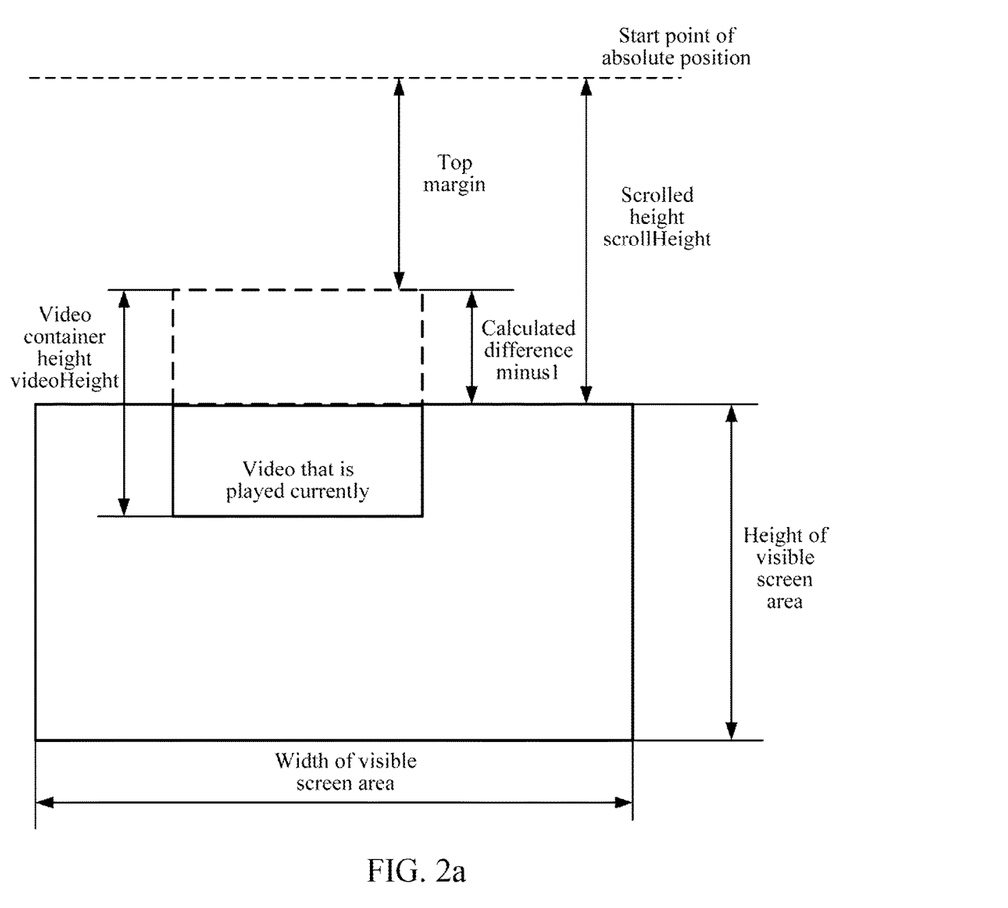
FIG. 2a is a schematic diagram of downward movement on a screen.
Figure 2B:
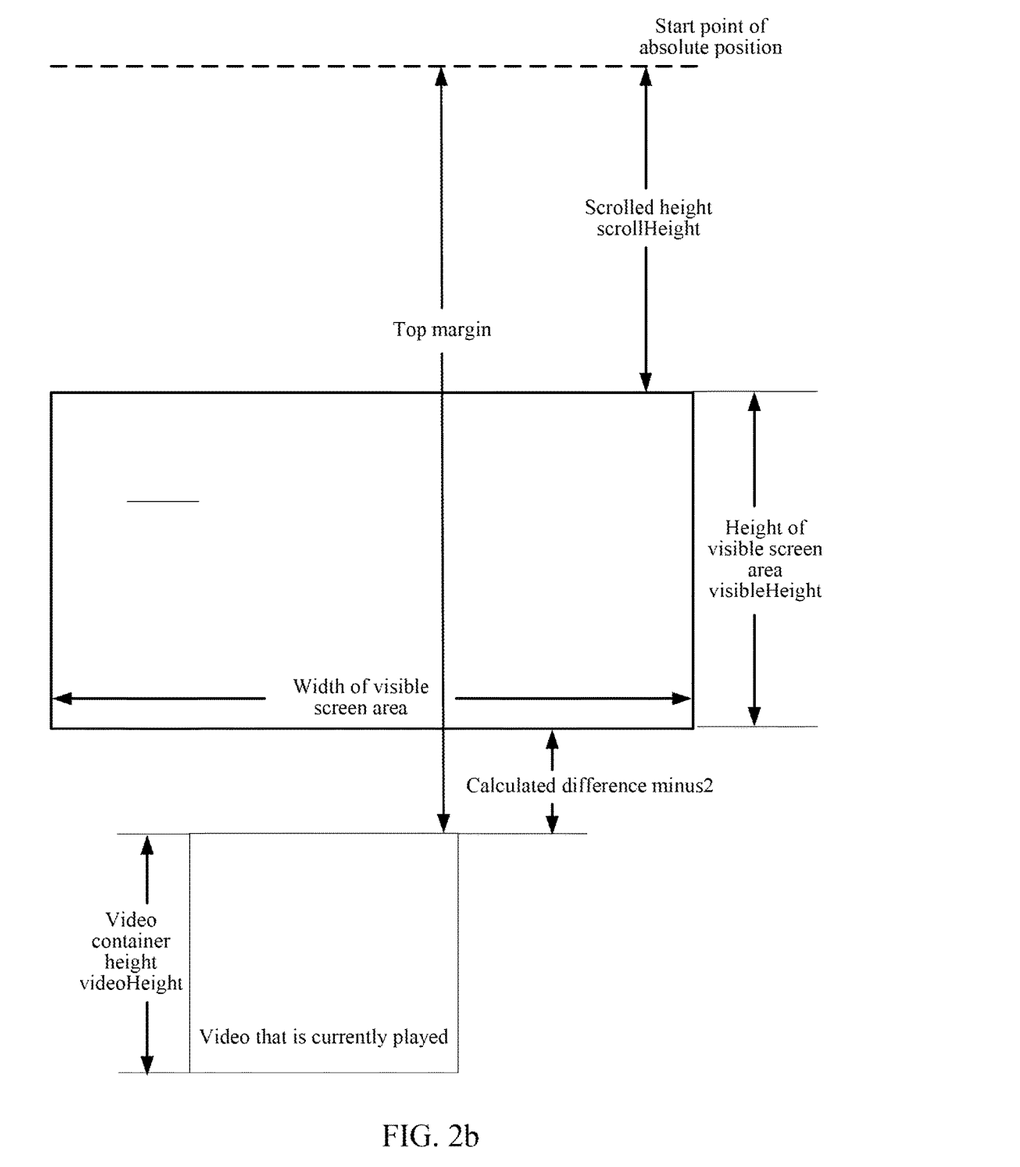
FIG. 2b is a schematic diagram of upward movement on a screen.

FIG. 2a and FIG. 2b are schematic diagrams of movement of a browser visible area according to an embodiment of the present disclosure. In FIG. 2a and FIG. 2b, illustrative description is performed by using a video playing container as an example. FIG. 2a is a schematic diagram of downward movement on a screen. FIG. 2b is a schematic diagram of upward movement on a screen.

As shown in FIG. 2a and FIG. 2b, the height of the video playing container is represented as VideoHeight; a start point of a browser screen absolute position is an upper edge; correspondingly, an absolute distance of the video playing container in the screen layout is represented as Top; and a distance by which the current screen is scrolled is represented as ScrollHeight.

When the screen is scrolled down, a difference, represented as minus1, between the distance by which the current screen is scrolled, scrollHeight, and the absolute distance of the video container in the screen layout, Top, is calculated as:

$$Minus1 = scrollHeight - Top.$$

If minus1 is greater than or equal to videoHeight, it indicates that the video playing container leaves the visible area; otherwise, at least a part of the video container which performs playing currently is located in the visible screen area.

When the screen is scrolled up, a difference, represented as minus2, between a value resulted from the distance by which the current screen is scrolled, scrollHeight, plus the height of the visible screen area, visibleHeight, and the absolute distance of the video container in the screen layout, Top, is calculated:

If minus2=scrollHeight+visibleHeight−Top is less than 0, it indicates that the video playing container leaves the visible area; otherwise, at least a part of the video container which performs playing currently is located in the visible screen area.

Although the above describes the embodiment of the present disclosure by using examples in which the screen is scrolled down and the screen is scrolled up, a person skilled in the art may realize that such description is merely for the purpose of illustration. In fact, the video playing container may also leave the screen visible area in any direction within 360°. The embodiments of the present disclosure are not limited thereto.

The embodiment of the present disclosure is described by using an example of video playing.

Figure 3:
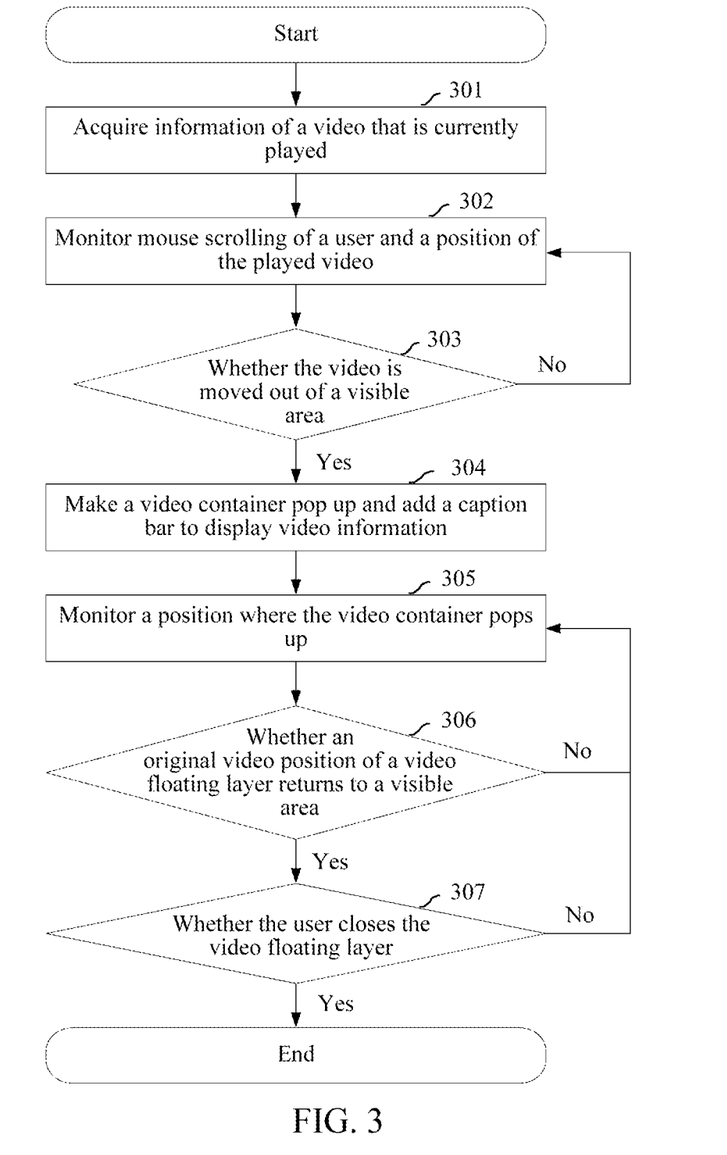
FIG. 3 is a schematic flowchart of a method for playing a video in a browser according to an embodiment of the present disclosure.

FIG. 3 is a schematic flowchart of a method for playing a video in a browser according to an embodiment of the present disclosure.

As shown in FIG. 3, the method includes the following steps.

Step 301: Acquiring information of a video that is currently played by a browser. For example, attribute information of a video file (for example, a name of a video file) and video playing information (for example, video playing duration) may be acquired.

Step 302: Monitoring a mouse scrolling operation of a user and a position, of a container of a video that is currently played, relative to a browser visible area. In this step, the mouse scrolling operation of the user may cause a webpage of the browser to scroll, thereby resulting in a change in the browser visible area.

Step 303: Determining whether the container of the video that is currently played is moved out of the browser visible area; if the container of the video that is currently played is moved out of the browser visible area, performing step 304 and subsequent steps; otherwise, going back to step 302 and subsequent steps.

Step 304: Setting a position attribute of the video container to move the container of the video that is currently played into a new visible area of the browser. In this step, a mode in which a floating layer pops up may be used to move the container of the video that is currently played into the new visible area of the browser. In addition, dragging logic of the pop-up video floating layer may be initialized, so that the user can execute, in the new visible area of the browser, a dragging operation for the pop-up video floating layer.

Step 305: Monitoring a position of the pop-up video floating layer in the webpage.

Step 306: Determining whether an original video position of the pop-up video floating layer returns into the visible area; if the original video position returns into the visible area, performing step 307 and subsequent steps; otherwise, performing step 305 and subsequent steps.

Step 307: Determining whether the user closes the pop-up video floating layer; if the user closes the pop-up video floating layer, ending the process; otherwise, moving the pop-up video floating layer to the original position.

In view of the above, by using the man-machine interaction solution for watching multimedia in a visible screen area as proposed in the embodiment of the present disclosure, operations become more convenient for a user when the user views information in an aggregation page, for example, a social website, that aggregates various types of information, and the problem in an existing social website that a user cannot view friends' status and at the same time watch multimedia is solved.

On such a basis, in the embodiment of the present disclosure, a slow animation during switching of the multimedia container and the original position is more natural. Switching logic is triggered only when a played video is moved out of a visible area. Moreover, a personalized operation of dragging a video floating layer is provided and a new interaction mode is provided for a user to view webpage information.

On the basis of the above detailed analysis, the embodiments of the present disclosure further provide an apparatus for playing multimedia in a browser.

Figure 4:
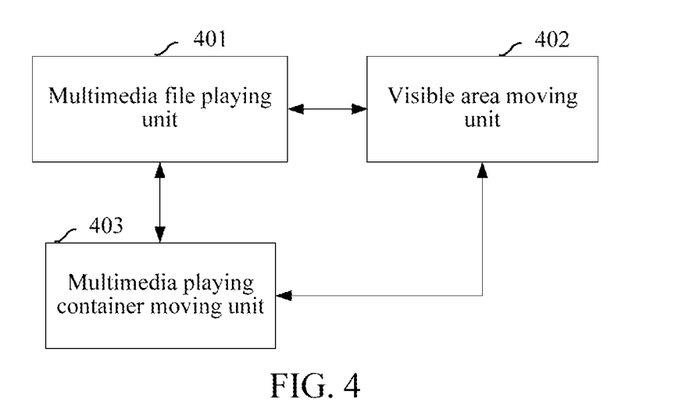
FIG. 4 is a structural diagram of an apparatus for playing multimedia in a browser according to an embodiment of the present disclosure.

FIG. 4 is a schematic structural diagram of an apparatus for playing multimedia in a browser according to an embodiment of the present disclosure.

As shown in FIG. 4, the apparatus includes a multimedia file playing unit 401, a visible area moving unit 402, and a multimedia playing container moving unit 403.

The multimedia file playing unit 401 is configured to play a multimedia file in a multimedia playing container located in a browser visible area.

The visible area moving unit 402 is configured to move the browser visible area, and monitor a position of the multimedia playing container relative to the browser visible area.

The multimedia playing container moving unit 403 is configured to set, in case of determining according to the position of the multimedia playing container relative to the browser visible area that the multimedia playing container is moved out of the browser visible area, a position attribute of the multimedia playing container to move the multimedia playing container into the browser visible area.

In an embodiment, the multimedia playing container moving unit 403 is configured to determine, according to a distance by which the browser visible area is already moved and an absolute distance of the multimedia playing container on a browser screen, that the multimedia playing container is moved out of the browser visible area.

Preferably, the multimedia playing container moving unit 403 is configured to: when the browser visible area is moved downwards on the screen, if a difference between the distance by which the browser visible area is already moved and the absolute distance of the multimedia playing container on the browser screen is greater than the height of the multimedia playing container, determine that the multimedia playing container is moved out of the browser visible area; and/or, when the browser visible area is moved upwards on the screen, if a difference between the distance by which the browser visible area is already moved and the absolute distance of the multimedia playing container on the browser screen is less than the height of the multimedia playing container, determine that the multimedia playing container is moved out of the browser visible area.

In an embodiment, the multimedia playing container moving unit 403 is configured to set the position attribute of the multimedia playing container as "fixed", and set a left margin and a top margin of the multimedia playing container, so as to set the multimedia playing container to be in a blank area of the browser visible area.

Preferably, the multimedia playing container moving unit 403 is further configured to set a width value and a height value of the multimedia playing container, so as to perform a zooming-out or zooming-in operation on the multimedia playing container.

In an embodiment, the multimedia playing container moving unit 403 is further configured to set, when the original position of the multimedia playing container returns to the browser visible area again, the position attribute of the multimedia playing container to move the multimedia playing container to the original position.

In an embodiment, the multimedia playing container moving unit 403 is configured to move the multimedia playing container into the browser visible area in at least one mode of the following: moving the multimedia playing container into the browser visible area in a fade-in, fade-out display mode; moving the multimedia playing container into the browser visible area in a direct switching display mode; moving the multimedia playing container into the browser visible area in a mode in which the multimedia playing container is moved rightwards in the process of moving the browser visible area; moving the multimedia playing container into the browser visible area in a mode in which the multimedia playing container is moved leftwards in the process of moving the browser visible area; moving the multimedia playing container into the browser visible area in a mode in which the multimedia playing container is moved upwards in the process of moving the browser visible area; or moving the multimedia playing container into the browser visible area in a mode in which the multimedia playing container is moved downwards in the process of moving the browser visible area.

In fact, multiple forms may be used to specifically implement the method and the apparatus for playing multimedia in a browser proposed in the embodiments of the present disclosure. For example, by using an application program interface that follows a particular standard, the method for playing multimedia in a browser may be compiled into a plug-in program installed on a personal computer, a mobile terminal, or the like, or may also be encapsulated as an application program for download and use by a user. When being compiled into a plug-in program, the method may be implemented in multiple plug-in forms such as ocx, dll, and cab. Moreover, the specific technologies such as a Flash plug-in, a RealPlayer plug-in, an MMS plug-in, a MIDI stave plug-in, and an ActiveX plug-in may also be used to implement the method for playing multimedia in a browser proposed in the embodiments of the present disclosure.

The method for playing multimedia in a browser proposed in the embodiments of the present disclosure may be stored in various storage media in a storage mode of storing instructions or an instruction set. These storage media include, but are not limited to, floppy disk, optical disc, DVD, hard disk, flash memory, USB flash drive, CF card, SD card, MMC card, SM card, memory stick, and xD card.

In addition, the method for playing multimedia in a browser proposed in the embodiments of the present disclosure is also applicable to flash memory (Nand flash)-based storage media, such as U flash memory, CF card, SD card, SDHC card, MMC card, SM card, memory stick, and xD card.

Additionally, it should be clarified that not only the program code read by a computer from the storage media may be executed, but also instructions based on the program code may be used to enable an operating system that runs on a computer to implement some or all of the actual operations, thereby implementing the functions of any one of the embodiments in the described examples.

Figure 5:
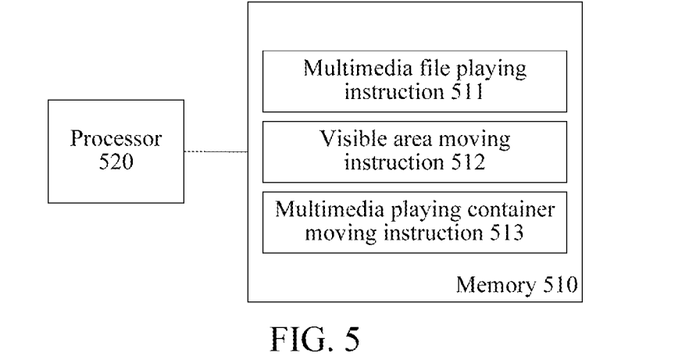
FIG. 5 is another structural diagram of an apparatus for playing multimedia in a browser according to an embodiment of the present disclosure.

For example, FIG. 5 is another schematic structural diagram of an apparatus for playing multimedia in a browser according to an embodiment of the present disclosure. As shown in FIG. 5, the apparatus includes: a memory 510, and a processor 520 in communication connection with the memory 510. The memory 510 stores computer executable instructions that may be executed by the processor 520. The computer executable instructions may include: a multimedia file playing instruction 511, a visible area moving instruction 512, and a multimedia playing container moving instruction 513, which are respectively used for instructing the processor 520 to execute functions of the multimedia file playing unit 401, the visible area moving unit 402, and the multimedia playing container moving unit 403 shown in FIG. 4.

In conclusion, in the embodiment of the present disclosure, a multimedia file is played in a multimedia playing container located in a browser visible area; the browser visible area is moved, and a position of the multimedia playing container relative to the browser visible area is monitored; and in case of determining according to the position of the multimedia playing container relative to the browser visible area that the multimedia playing container is moved out of the browser visible area, a position attribute of the multimedia playing container is set to move the multimedia playing container into the browser visible area. In view of the above, with the embodiments of the present disclosure, if a multimedia playing container which performs playing currently leaves a screen visible area, a position attribute of the multimedia playing container may be set to enable the multimedia playing container to be presented in a new visible area, so that a user can follow changes in multimedia information while browsing other information, and therefore it is achieved that when a multimedia playing area is moved out of a current visible area, a user can still browse multimedia.

Moreover, with the embodiments of the present disclosure, once a user continues to scroll a webpage and an original video position of a multimedia playing container is again located in a visible area, a video playing container can be switched back to the original video position, so that operational complexity is reduced.

It may be understood that each of the units or modules in the UE or apparatus for playing the multimedia content on a browser may be a software functional module constituted by a program instruction stored in a memory (e.g., a computer-readable storage medium, such as a hard disk, an optical disk, a solid state memory such as a flash memory) on a UE or a server, or in a cloud memory accessed via an Internet connection. The units or modules may be hardware program codes modules constituted as logic gates microcodes within a ROM, a processor or a controller, or a as functional modules constituted by both software/hardware together. The functional modules or program codes stored in a memory may be executed by the processor to configure the UE to perform the functions described in the various embodiments.

The above descriptions are merely preferred embodiments of the present invention, and are not intended to limit the present disclosure. Any modification, equivalent replacement, or improvement made within the spirit and principle of the present disclosure shall fall within the protection scope of the present disclosure.

What is claimed is:

1. A method for playing multimedia in a browser of a user equipment (UE), comprising:
    playing a multimedia file in a multimedia playing container while the multimedia playing container is embedded within a webpage and while an original embedded position of the multimedia playing container in the webpage is located in a browser visible area on a browser screen of the UE;
    detecting a user operation of scrolling the webpage applied to the UE;
    in response to the user operation, moving the browser visible area of the browser screen relative to the webpage including the embedded multimedia playing container;
    monitoring a position of the multimedia playing container that changes relative to the browser visible area during the movement of the browser visible area relative to the webpage;
    during movement of the browser visible area of the browser screen relative to the webpage with the multimedia playing container embedded at the original embedded position in the webpage:
  in accordance with determining, according to the position of the multimedia playing container that has changed relative to the browser visible area during the movement of the browser visible area, that the multimedia playing container is moved out of the browser visible area, initiating a first container switching animation that fades out the multimedia playing container from the original embedded position of the multimedia playing container in the webpage and fades in the multimedia playing container at a respective floating location in the browser visible area;
  in accordance with determining, according to the position of the multimedia playing container that has changed relative to the browser visible area during the movement of the browser visible area, that the multimedia playing container is not moved out of the browser visible area, maintaining the multimedia playing container at the original embedded position within the webpage that is moving relative to the browser visible area; and
during movement of the browser visible area of the browser screen relative to the webpage after the multimedia playing container is faded away from the original embedded position in the webpage:
  in accordance with determining, during the movement of the browser visible area relative to the webpage, that the original embedded position of the multimedia playing container in the webpage has returned to be within the browser visible area from outside of the browser visible area, initiating a second container switching animation that fades out the multimedia playing container from the respective floating location in the browser visible area and fades in the multimedia playing container at the original embedded position of the multimedia playing container in the webpage.

2. The method for playing multimedia in the browser according to claim 1, wherein the determining, according to the position of the multimedia playing container that has changed relative to the browser visible area during the movement of the browser visible area, that the multimedia playing container is moved out of the browser visible area, comprises:
  determining, according to a distance by which the browser visible area is already moved and an absolute distance of the multimedia playing container on the browser screen, that the multimedia playing container is moved out of the browser visible area.

3. The method for playing multimedia in a browser according to claim 2, wherein:
  if a start point of a browser screen absolute position is an upper edge, one or both of the following takes place:
  when the browser visible area is moved downwards on the browser screen, and a difference between the distance by which the browser visible area is already moved and the absolute distance of the multimedia playing container on the browser screen is greater than a height of the multimedia playing container, it is determined that the multimedia playing container is moved out of the browser visible area; and/or,
  when the browser visible area is moved upwards on the screen, and a value, resulted from the distance by which the browser visible area is already moved plus the height of the browser visible area, has a difference less than 0 from the absolute distance of the multimedia playing container on the browser screen, it is determined that the multimedia playing container is moved out of the browser visible area; and
  if a start point of a browser screen absolute position is a lower edge, one or both of the following takes place:
  when the browser visible area is moved downwards on the screen, and a value, resulted from the distance by which the browser visible area is already moved plus the height of the browser visible area, has a difference less than 0 from the absolute distance of the multimedia playing container on the browser screen, it is determined that the multimedia playing container is moved out of the browser visible area; and/or
  when the browser visible area is moved upwards on the screen, and a difference between the distance by which the browser visible area is already moved and the absolute distance of the multimedia playing container on the browser screen is greater than the height of the multimedia playing container, it is determined that the multimedia playing container is moved out of the browser visible area.

4. The method for playing multimedia in a browser according to claim 1, further comprising setting a position attribute of the multimedia playing container to move the multimedia playing container to the respective floating location in the browser visible area, wherein setting the position attribute comprises:
  setting the position attribute of the multimedia playing container as "fixed", and setting a left margin and a top margin of the multimedia playing container, so as to set the multimedia playing container to be in a blank area of the browser visible area.

5. The method for playing multimedia in a browser according to claim 4, further comprising:
  setting a width value and a height value of the multimedia playing container, so as to perform a zooming-out or zooming-in operation on the multimedia playing container.

6. The method for playing multimedia in a browser according to claim 1, further comprising:
  acquiring attribute information of the multimedia file; and
  displaying, when the multimedia playing container is moved into the browser visible area, the attribute information of the multimedia file in a caption bar of the multimedia playing container.

7. The method for playing multimedia in a browser according to claim 1, further comprising:
  acquiring multimedia playing information; and
  controlling, after the multimedia playing container is moved into the browser visible area, playing of the multimedia file according to the multimedia playing information.

8. An apparatus for playing multimedia in a browser of a user equipment (UE), comprising a processor executing instruction codes stored in a memory to configure the apparatus to carry out the following operations:
  playing a multimedia file in a multimedia playing container while the multimedia playing container is embedded within a webpage and while an original embedded position of the multimedia playing container in the webpage is located in a browser visible area on a browser screen of the UE;
  detecting a user operation of scrolling the webpage applied to the UE;

in response to the user operation, moving the browser visible area relative to the webpage including the embedded multimedia playing container;

monitoring a position of the multimedia playing container that changes relative to the browser visible area during the movement of the browser visible area relative to the webpage;

during movement of the browser visible area of the browser screen relative to the webpage with the multimedia playing container embedded at the original embedded position in the webpage:

in accordance with determining, according to the position of the multimedia playing container that has changed relative to the browser visible area during the movement of the browser visible area, that the multimedia playing container is moved out of the browser visible area, initiating a first container switching animation that fades out the multimedia playing container from the original embedded position of the multimedia playing container in the webpage and fades in the multimedia playing container at a respective floating location in the browser visible area;

in accordance with determining, according to the position of the multimedia playing container that has changed relative to the browser visible area during the movement of the browser visible area, that the multimedia playing container is not moved out of the browser visible area, maintaining the multimedia playing container at the original embedded position within the webpage that is moving relative to the browser visible area; and during movement of the browser visible area of the browser screen relative to the webpage after the multimedia playing container is faded away from the original embedded position in the webpage:

in accordance with determining, during the movement of the browser visible area relative to the webpage, that the original embedded position of the multimedia playing container in the webpage has returned to be within the browser visible area from outside of the browser visible area, initiating a second container switching animation that fades out the multimedia playing container from the respective floating location in the browser visible area and fades in the multimedia playing container at the original embedded position of the multimedia playing container in the webpage.

9. The apparatus for playing multimedia in a browser according to claim 8, wherein the apparatus is further configured to:

determine, according to a distance by which the browser visible area is already moved and an absolute distance of the multimedia playing container on the browser screen, that the multimedia playing container is moved out of the browser visible area.

10. The apparatus for playing multimedia in a browser according to claim 9, wherein the apparatus is further configured to:

if a start point of a browser screen absolute position is an upper edge, one or both of the following takes place:

when the browser visible area is moved downwards on the screen, and a difference between the distance by which the browser visible area is already moved and the absolute distance of the multimedia playing container on the browser screen is greater than a height of the multimedia playing container, determine that the multimedia playing container is moved out of the browser visible area; and/or when the browser visible area is moved upwards on the screen, and a value, resulted from the distance by which the browser visible area is already moved plus the height of the browser visible area, has a difference less than 0 from the absolute distance of the multimedia playing container on the browser screen, determine that the multimedia playing container is moved out of the browser visible area;

if a start point of a browser screen absolute position is a lower edge, one or both of the following takes place:

when the browser visible area is moved downwards on the screen, and a value, resulted from the distance by which the browser visible area is already moved plus the height of the browser visible area, has a difference less than 0 from the absolute distance of the multimedia playing container on the browser screen, determine that the multimedia playing container is moved out of the browser visible area; and/or when the browser visible area is moved upwards on the screen, and a difference between the distance by which the browser visible area is already moved and the absolute distance of the multimedia playing container on the browser screen is greater than the height of the multimedia playing container, determine that the multimedia playing container is moved out of the browser visible area.

11. The apparatus for playing multimedia in a browser according to claim 8, wherein the apparatus is further configured to:

set a position attribute of the multimedia playing container as "fixed", and set a left margin and a top margin of the multimedia playing container, so as to set the multimedia playing container to be in a blank area of the browser visible area.

12. The apparatus for playing multimedia in a browser according to claim 11, wherein the apparatus is further configured to:

set a width value and a height value of the multimedia playing container, so as to perform a zooming-out or zooming-in operation on the multimedia playing container.

13. A non-transitory computer readable storage medium for storing computer program codes, wherein the computer program codes when executed by a processor, enable a user equipment (UE) to play multimedia content in a browser of the UE, the playing of the multimedia in the browser, comprising:

playing a multimedia file in a multimedia playing container while the multimedia playing container is embedded within a webpage and while an original embedded position of the multimedia playing container in the webpage is located in a browser visible area on a browser screen of the UE;

detecting a user operation of scrolling the webpage applied to the UE;

in response to the user operation, moving the browser visible area relative to the webpage including the embedded multimedia playing container;

monitoring a position of the multimedia playing container that changes relative to the browser visible area during the movement of the browser visible area relative to the webpage;

during movement of the browser visible area of the browser screen relative to the webpage with the multimedia playing container embedded at the original embedded position in the webpage:

in accordance with determining, according to the position of the multimedia playing container that has changed relative to the browser visible area during the movement of the browser visible area, that the multimedia playing container is moved out of the browser visible area, initiating a first container switching animation that fades out the multimedia playing container from the original embedded position of the multimedia playing container in the webpage and fades in the multimedia playing container at a respective floating location in the browser visible area;

in accordance with determining, according to the position of the multimedia playing container that has changed relative to the browser visible area during the movement of the browser visible area, that the multimedia playing container is not moved out of the browser visible area, maintaining the multimedia playing container at the original embedded position within the webpage that is moving relative to the browser visible area; and during movement of the browser visible area of the browser screen relative to the webpage after the multimedia playing container is faded away from the original embedded position in the webpage:

in accordance with determining, during the movement of the browser visible area relative to the webpage, that the original embedded position of the multimedia playing container in the webpage has returned to be within the browser visible area from outside of the browser visible area, initiating a second container switching animation that fades out the multimedia playing container from the respective floating location in the browser visible area and fades in the multimedia playing container at the original embedded position of the multimedia playing container in the webpage.

\* \* \* \* \*